United States Patent Office  2,951,777
Patented Sept. 6, 1960

2,951,777

NYLON GEL ELIMINATION

Joseph Zimmerman, Wilmington, Del., assignor to E. I. du Pont de Nemours and Company, Wilmington, Del., a corporation of Delaware No Drawing. Filed June 30, 1955, Ser. No. 519,226

3 Claims. (Cl. 134—42)

This invention relates to extrusion of nylon, concerning particularly melt-extrusion of fiber-forming gel-susceptible polyamide without interference from polymer gel.

Manufacture of fiber-forming polyamides by condensation polymerization of diamines and dibasic acids is taught by Carothers in Patent 2,190,770, while apparatus and methods for extruding those and other polymeric materials as self-supporting filaments are set forth by Greenewalt in Patent 2,217,743 and by Waltz in Patent 2,571,975. In general, polymer in the form of solid chips or flakes is melted by heating and then is extruded by pumping through orifices into filamentary form. The commercial success of polyhexamethylene adipamide as a component of synthetic fibers is well known. When molten, this polyamide made from adipic acid and hexamethylenediamine shares with other polymeric adipamides an undesirable characteristic of gelling if allowed to stagnate, presumably first undergoing a decarboxylation reaction and subsequent branching or cross-linking of the products of the decarboxylation reaction. Gelling of molten polymer in the extrusion stream alters the viscosity, frequently produces deposits on heated surfaces of the equipment, and may actually clog the orifices; these occurrences are productive of abnormal physical properties in the extruded article, particularly when small particles of the gelled polyamide break off and mix with the normal polyamide.

A primary object of the present invention is elimination of polymer gel in extrusion of polymeric adipamides. An object is conversion of polymeric adipamide gel to fusible condition. A further object is removal of polymeric adipamide gel from extrusion equipment without removing the equipment from operation. Other objects, together with means and methods for attaining the various objects, will be apparent from the following description.

In general, the objects of the present invention are accomplished by contacting gelled polymers containing recurring adipamide groups sufficiently with liquid carboxylic acid at a temperature above the melting point of the ungelled polyamide. High-boiling dibasic acids are best suited to the practice of this invention, especially adipic acid, which is a component of the class of polyamides having greatest tendency to gel, but monobasic acids are similarly useful in somewhat higher concentration. The amount of acid required also will vary with the severity of the gelling; gel resulting from polymeric adipamides held at a temperature above the melting point of the ungelled polymer for more than a few weeks no longer resembles a polyamide, being so degraded that it is not amenable to the process of this invention. Upon treatment with a suitable acid in satisfactory amount, ranging from several (more than two) percent of dibasic to upwards of an equal weight of monobasic acid, the undegraded gel undergoes a marked decrease in viscosity, permitting its ready removal from adjacent surfaces; an excess of acid, based upon gel weight, can be used, to assure conversion of the gel to a fusible material readily flushed out of the processing equipment. As a liquid phase of the acid is essential, acids normally boiling above about 250° C. usually are preferable, although lower-boiling acids are useful under pressure or with unusually low-melting polyamides. The practice of the present invention is exemplified below in illustrative detail, all parts and percentages being by weight unless otherwise indicated.

*Example I*

Fifty parts polyhexamethylene adipamide having a relative viscosity of 45 (in 90% formic acid) are heated for 72 hours in a container at 282° C. under 1 atmosphere of steam to form an infusible gel, which is also insoluble in 90% formic acid at room temperature. Upon the addition of 5 parts adipic acid, at the same temperature, the gel becomes fluid almost immediately, attaining within a few minutes a relative viscosity of about 15, and is removed readily from the container.

When the procedure of Example I was followed except that sebacic acid (5 parts) was added to a sample of the same gel, again the gel was converted to fusible condition. Upon the addition of 5 parts adipic acid to gel produced as in the above example and heated for an additional 116 hours, incomplete conversion resulted; however, upon the addition of a total of 10 parts adipic acid, the gel became completely fusible. When the procedure of Example I was repeated upon gel produced by heating of polyhexamethylene adipamide for 15 days at 282° C., addition of 12.5 parts adipic acid converted the gel to fluid condition. However, when the gel was produced under an extended heating period totalling 22 days, the addition of an excess of (up to 100 grams) adipic acid failed to convert the gel to a fusible state; it is postulated that this polymer gel became so degraded, as well as branched, that it no longer resembled the polyamide and could not be fluidized by any amount of molten acid.

*Example II*

To 20 parts gelled polyhexamethylene adipamide, removed, after three days continuous operation, from a melting and spinning assembly used in the production of nylon yarn, 4 parts adipic acid are added at 282° C. The gel, which had been insoluble in 90% formic acid at room temperature and infusible at temperatures above 300° C., is readily converted to a fluid state within a few minutes.

*Example III*

Fifty parts polyhexamethylene adipamide are heated at 282° C. in a test tube for 5 days in the presence of rods of aluminum, carbon steel, and stainless steel under 1 atmosphere of steam to form an infusible gel upon the surfaces of the metals. Upon the addition of 10 grams of adipic acid at the indicated temperature, the gel is converted to fusible condition, and the metal rods become free of polymer with slight stirring, thus indicating no significant change in the nature of the gel formed in contact with these metals.

In addition to the molten acids already depicted above, other mono- or difunctional acids or their anhydrides capable of converting nylon gel to fusible material at temperatures above the melting point of the polyamide include, among others, aliphatic dicarboxylic acids containing from about five to about ten carbon atoms in the chain (e.g., the straight-chain saturated diacids from glutaric to sebacic), aliphatic monocarboxylic acids containing from about nine to about twenty carbon atoms in the chain (e.g., the straight-chain saturated acids from pelargonic to arachidic), aromatic monobasic and dibasic carboxylic acids, such as benzoic and phthalic. In treatment of a typical nylon gel prepared by exposing polyhexamethylene (relative viscosity of about 40) to temperature of 282° C. under an atmosphere of steam for 72 hours, samples of the gel became fluid within 30 minutes after contact with about 25%, 50%, and 50%, respectively, of the following monobasic acids and 15% of the following dibasic acids: (1) n-nonylic, stearic, oleic; (2) glutaric, suberic, azelaic, alpha-methyl suberic.

Although the mechanism by which the added acid affects the gel is understood only imperfectly, perhaps the addition of such highly carboxylic material to the three-dimensional polymer gel changes the molecular weight distribution of the polymer, in addition to possibly rupturing cross-links. Addition of acid to the ungelled polymer does not change the molecular-weight distribution, although causing a decrease in average molecular weight; furthermore, ungelled polymer is affected more in this way by monobasic carboxylic acids than by dibasic, which further distinguishes the gel-fluidizing effect of the practice involved here.

For reasons of simplicity, this invention has been particularly described in terms of polyhexamethylene adipamide, since that is the polymer used to produce nylon yarn commonly available on the market. However, the procedure of this invention applies to other polymers containing recurring adipamide groups, which are gel-susceptible. The identity of the diamine component apparently is immaterial to the gelling tendency, no difference in susceptibility being observed between polymer made from hexamethylenediamine and otherwise identical product made from decamethylenediamine, for example. The reaction product of either of these or similar diamines with other dibasic acids (e.g., sebacic) or their amide-forming derivatives is not susceptible.

Instead of awaiting occurrence of gel in equipment used to process polymeric adipamides, it is possible to forestall gel formation by supplying suitable acid continuously or at relatively frequent intervals to those surfaces where gel is known to occur. This may be accomplished through perforations or porous inserts in the walls or other surfaces. As the gel concentration will remain very low or even nil in this practice, the added acid may be kept at sufficiently low concentration as not to affect adversely the viscosity or other properties of the polyamide or articles made therefrom, such as filaments or film.

Benefits of practicing the present invention will be apparent to those persons undertaking the operation or maintenance of autoclaves, screw melter-extruder system, or other vessels in which molten gel-susceptible polyamides are prepared, held or passed through, including pipes or ducts through which the molten polyamides are pumped or caused to flow by usual means.

The claimed invention:

1. Process comprising eliminating a gelled polymer consisting of recurring polyhexamethylene adipamide groups from equipment from processing a molten gel-susceptible polymer consisting of recurring polyhexamethylene adipamide groups and formed during said processing by adding to the equipment at a temperature of about 282° C. more than 2% by weight of a liquid carboxylic acid free from non-carboxylic substitutent groups capable of reacting with carboxyl groups and having a boiling temperature above 250° C. and being liquid at about 282° C., whereupon the gelled polymer becomes liquid; said acid comprising one from the group consisting of aliphatic dicarboxylic acids containing from about 5 to about 10 carbon atoms, aliphatic monocarboxylic acids containing from about 9 to about 20 carbon atoms, aromatic non-basic carboxylic acids containing one aromatic group and dibasic carboxylic acids containing one aromatic group.

2. The process of claim 1 wherein the acid is added in an amount of from about 15% to about 50% by weight of the gelled polymer.

3. The process of claim 1 wherein the acid consists of adipic acid.

References Cited in the file of this patent

UNITED STATES PATENTS

| | | |
|---|---|---|
| 2,174,527 | Peterson | Oct. 3, 1939 |
| 2,190,770 | Carothers | Feb. 20, 1940 |
| 2,337,834 | Peters | Dec. 28, 1943 |
| 2,374,126 | Peters | Apr. 17, 1945 |

OTHER REFERENCES

Concise Chemical & Technical Dictionary (Bennett). Chemical Publ. Co. (Brooklyn, N.Y.) (1947), page 676.